(12) United States Patent
Crawford et al.

(10) Patent No.: US 10,606,486 B2
(45) Date of Patent: Mar. 31, 2020

(54) WORKLOAD OPTIMIZED PLANNING, CONFIGURATION, AND MONITORING FOR A STORAGE SYSTEM ENVIRONMENT

(71) Applicant: International Business Machines Corporation, Armonk, NY (US)

(72) Inventors: Joshua J. Crawford, Tucson, AZ (US); Matthew J. Ward, Vail, AZ (US); Paul A. Jennas, II, Tucson, AZ (US); Jason L. Peipelman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 15/881,626

(22) Filed: Jan. 26, 2018

(65) Prior Publication Data
US 2019/0235765 A1 Aug. 1, 2019

(51) Int. Cl.
*G06F 3/06* (2006.01)

(52) U.S. Cl.
CPC .......... *G06F 3/0613* (2013.01); *G06F 3/0607* (2013.01); *G06F 3/067* (2013.01); *G06F 3/0631* (2013.01); *G06F 3/0632* (2013.01); *G06F 3/0653* (2013.01)

(58) Field of Classification Search
CPC ............................... G06F 3/0613; G06F 3/067
USPC ........................................................ 711/170
See application file for complete search history.

(56) References Cited

U.S. PATENT DOCUMENTS

| | | | |
|---|---|---|---|
| 6,260,108 B1 * | 7/2001 | Barve | G06F 3/0613 |
| | | | 711/112 |
| 8,166,257 B1 | 4/2012 | Holl, II et al. | |
| 8,856,048 B2 | 10/2014 | Calcaterra et al. | |
| 9,043,798 B2 | 5/2015 | Calcaterra et al. | |
| 2003/0135609 A1 | 7/2003 | Carlson et al. | |

(Continued)

OTHER PUBLICATIONS

Da Rosa Righi et al., "AutoElastic: Automatic Resource Elasticity for High Performance Applications in the Cloud," IEEE Transactions on Cloud Computing, vol. 4, No. 1, Jan.-Mar. 2016, pp. 6-19.

(Continued)

*Primary Examiner* — Jae U Yu
(74) *Attorney, Agent, or Firm* — Zilka-Kotab, P.C.

(57) ABSTRACT

In one embodiment, a method includes determining requirements of a storage system by a planning module. The method also includes calculating, by the planning module, an initial configuration for the storage system, the initial configuration specifying a plurality of components that are interoperable to satisfy the requirements of the storage system. In addition, the method includes outputting a purchase file that describes all components that are specified by the initial configuration of the storage system. Moreover, the method includes outputting a configuration file that is interoperable with at least one of the components specified in the purchase file and is configured to automatically initialize the storage system in response to the components of the storage system being installed. In another embodiment, the method includes a management module receiving the configuration file and monitoring performance metrics of a plurality of workloads of the storage system during operation of the storage system.

17 Claims, 6 Drawing Sheets

(56) References Cited

U.S. PATENT DOCUMENTS

| | | | |
|---|---|---|---|
| 2003/0154343 A1* | 8/2003 | Yokokawa | H03M 13/2703 |
| | | | 711/5 |
| 2004/0006612 A1 | 1/2004 | Jibbe et al. | |
| 2006/0112253 A1* | 5/2006 | Takeda | G06F 11/008 |
| | | | 711/170 |
| 2015/0324135 A1 | 11/2015 | Chan et al. | |

OTHER PUBLICATIONS

AWS, "AWS Auto Scaling," 2018, 8 pages, retrieved from https://aws.amazon.com/autoscaling/.

* cited by examiner

WORKLOAD OPTIMIZED PLANNING, CONFIGURATION, AND MONITORING FOR A STORAGE SYSTEM ENVIRONMENT

BACKGROUND

The present invention relates to storage system environments, and more particularly, to a planning and monitoring tool for optimizing planning, configuration, and monitoring of a particular storage system environment.

Storage system environments have many different components interoperating together, depending on the particular needs and operating conditions that are specified for a particular end user. In order to provide a suitable storage system solution for an end user, a rigorous and time consuming planning process is manually performed by the end user and a storage system provider. During this planning process, an end user's current workload requirements and any known future workload requirements are taken into account when specifying which particular components and how many of certain types of components are to be used in the end user's new or modified storage system environment. When such a storage system solution is installed at the end user, the storage system solution is able to not only handle the current workloads, but also some of the projected workloads into the future.

This method of providing a storage system solution results in a system that is designed to accommodate months to years of usage for the end user without major modifications, assuming consistent customer growth that does not increase beyond a projected growth rate for the lifetime of the system. This currently used process requires a great deal of time exerted by the end user and the storage system provider, along with great subject matter expertise. Also, the assumptions used to design the storage system solution are often discarded or lost after the storage system solution is created and ultimately implemented.

SUMMARY

In one embodiment, a method includes determining requirements of a storage system by a planning module. The method also includes calculating, by the planning module, an initial configuration for the storage system, the initial configuration specifying a plurality of components that are interoperable to satisfy the requirements of the storage system. In addition, the method includes outputting a purchase file that describes all components that are specified by the initial configuration of the storage system. Moreover, the method includes outputting a configuration file that is interoperable with at least one of the components specified in the purchase file and is configured to automatically initialize the storage system in response to the components of the storage system being installed.

According to another embodiment, a method includes receiving a configuration file of a storage system at a management module, the configuration file being interoperable with at least one component of the storage system. The method also includes monitoring, by the management module, a plurality of performance metrics of a plurality of workloads of the storage system during operation of the storage system. The configuration file includes operating and/or initialization instructions for appropriate components specified by an initial configuration of the storage system that are executable to initialize the storage system after installation thereof and projected workload behavior for the plurality of workloads. The method also includes storing, by the management module, the plurality of performance metrics to a computer readable storage medium of the storage system. Moreover, the method includes determining, by the management module, whether a first performance metric for a first workload operating on the storage system deviates from a projected workload behavior for the first workload by more than a threshold amount.

According to yet another embodiment, a computer program product includes a computer readable storage medium having program instructions embodied therewith. The computer readable storage medium is not a transitory signal per se. Also, the embodied program instructions are executable by a processing circuit to cause the processing circuit to perform a method. The method includes determining requirements of a storage system by a planning module. The method also includes calculating, by the planning module, an initial configuration for the storage system, the initial configuration specifying a plurality of components that are interoperable to satisfy the requirements of the storage system. Also, the method includes outputting a purchase file that describes all components that are specified by the initial configuration of the storage system. Moreover, the method includes outputting a configuration file that is interoperable with at least one of the components specified in the purchase file and is configured to automatically initialize the storage system in response to the components of the storage system being installed.

Other aspects and embodiments of the present invention will become apparent from the following detailed description, which, when taken in conjunction with the drawings, illustrate by way of example the principles of the invention.

DETAILED DESCRIPTION

Figure 1:
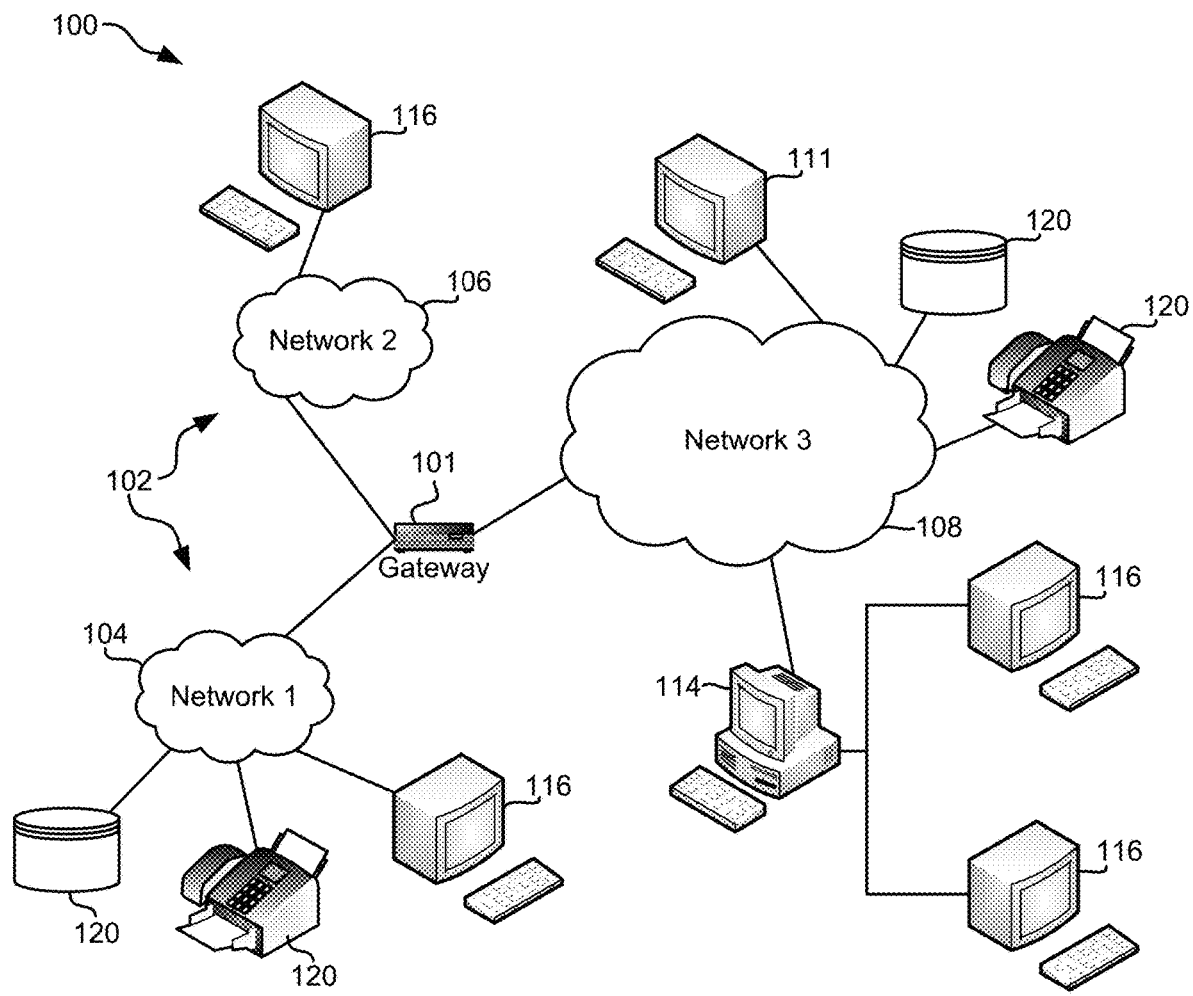
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for an automated storage configuration process that intakes and records workload assumptions and future growth projections, and provides a configuration for the storage system in an automated fashion. Subsequently, the automated storage configuration process monitors performance statistics of the operating storage system and compares the generated statistics against a projected workload behavior based on a configuration file to provide notification of behavior that is outside the expected envelope and to suggest hardware modification and/or additions that would remedy the aberrant behavior issue.

In one general embodiment, a method includes determining requirements of a storage system by a planning module. The method also includes calculating, by the planning module, an initial configuration for the storage system, the initial configuration specifying a plurality of components that are interoperable to satisfy the requirements of the storage system. In addition, the method includes outputting a purchase file that describes all components that are specified by the initial configuration of the storage system. Moreover, the method includes outputting a configuration file that is interoperable with at least one of the components specified in the purchase file and is configured to automatically initialize the storage system in response to the components of the storage system being installed.

According to another general embodiment, a method includes receiving a configuration file of a storage system at a management module, the configuration file being interoperable with at least one component of the storage system. The method also includes monitoring, by the management module, a plurality of performance metrics of a plurality of workloads of the storage system during operation of the storage system. The configuration file includes operating and/or initialization instructions for appropriate components specified by an initial configuration of the storage system that are executable to initialize the storage system after installation thereof and projected workload behavior for the plurality of workloads. The method also includes storing, by the management module, the plurality of performance metrics to a computer readable storage medium of the storage system. Moreover, the method includes determining, by the management module, whether a first performance metric for a first workload operating on the storage system deviates from a projected workload behavior for the first workload by more than a threshold amount.

According to yet another general embodiment, a computer program product includes a computer readable storage medium having program instructions embodied therewith. The computer readable storage medium is not a transitory signal per se. Also, the embodied program instructions are executable by a processing circuit to cause the processing circuit to perform a method. The method includes determining requirements of a storage system by a planning module. The method also includes calculating, by the planning module, an initial configuration for the storage system, the initial configuration specifying a plurality of components that are interoperable to satisfy the requirements of the storage system. Also, the method includes outputting a purchase file that describes all components that are specified by the initial configuration of the storage system. Moreover, the method includes outputting a configuration file that is interoperable with at least one of the components specified in the purchase file and is configured to automatically initialize the storage system in response to the components of the storage system being installed.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
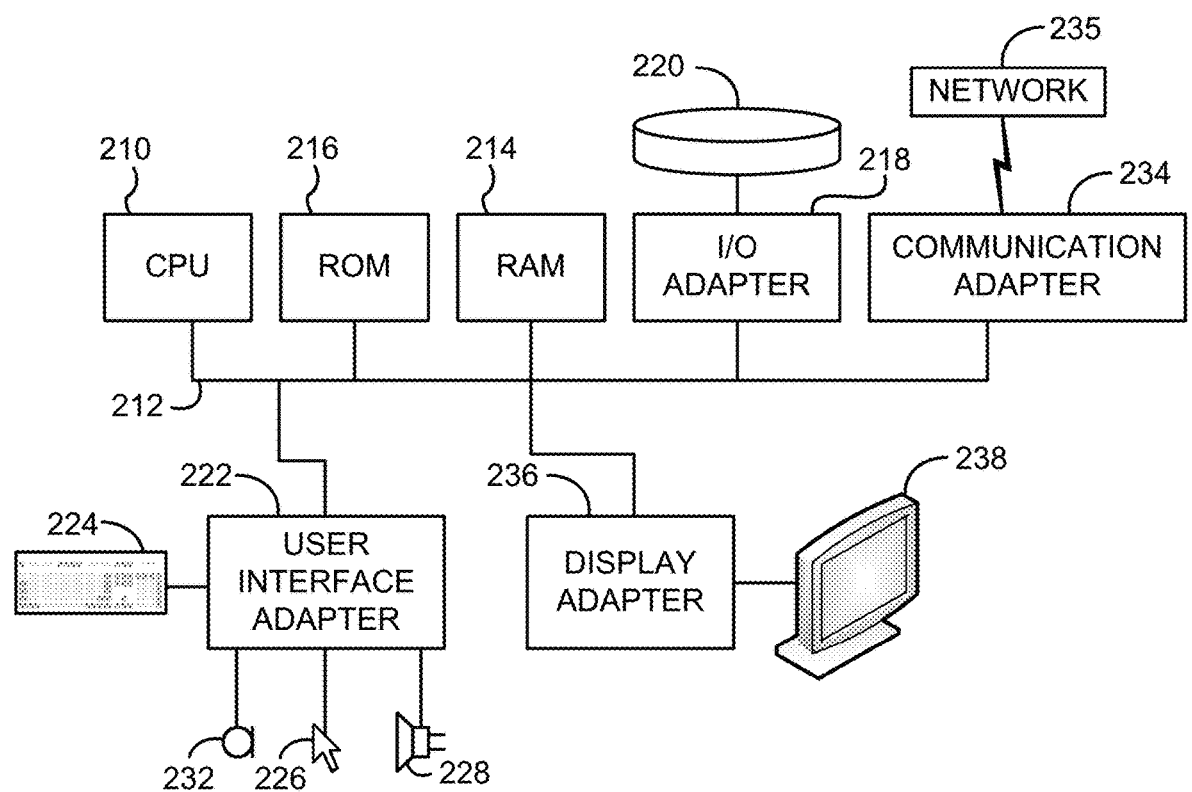
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
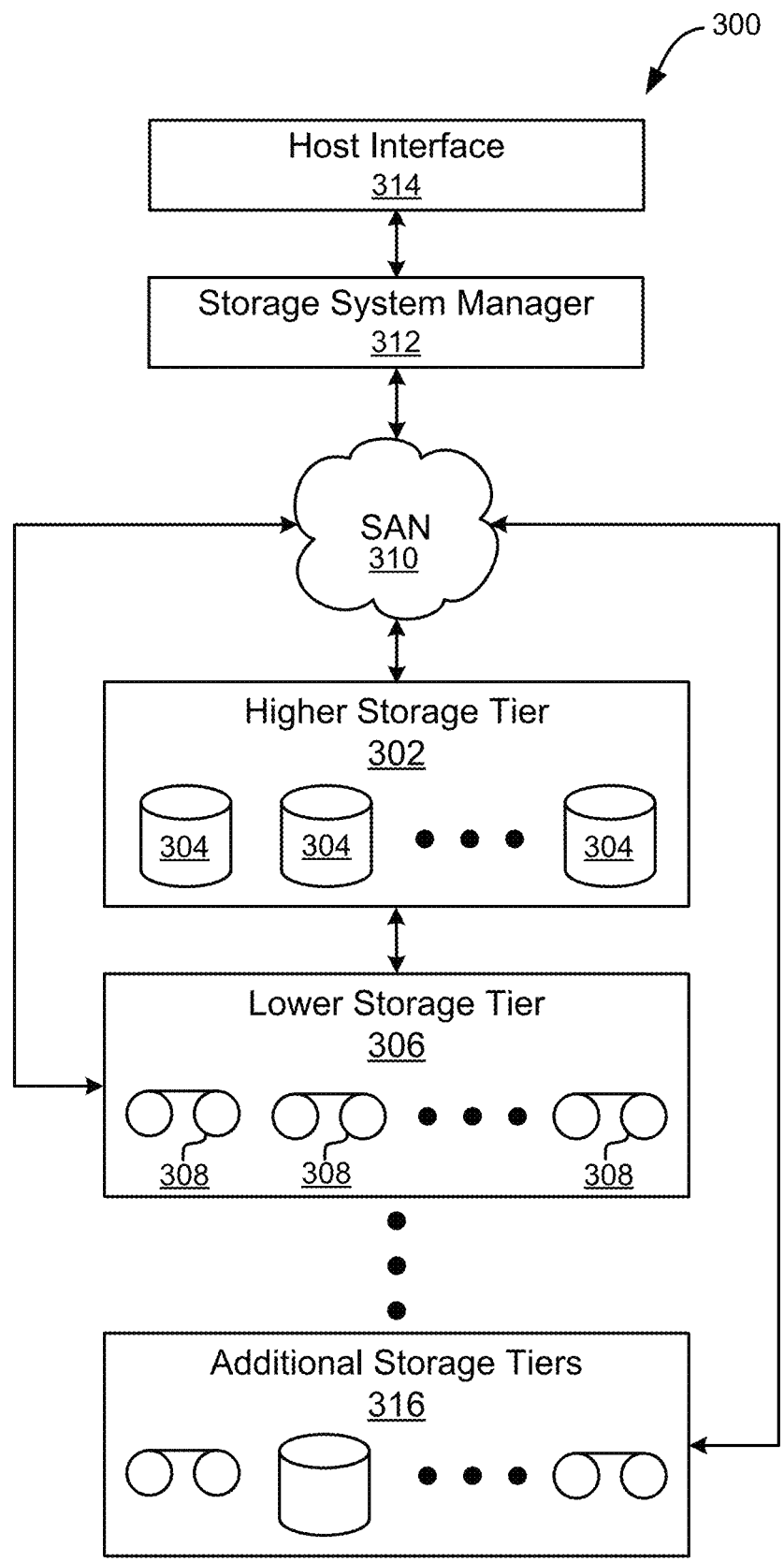
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Because of the difficulties associated with planning and implementing a storage system, either as a new build or a modification to an existing system, a need exists for an enhanced configuration process that helps an end user take into account workload assumptions along with assumptions on future growth, to automatically plan a storage system configuration that will match the current and future needs. This automated planning process will remember and store the projected future workloads and assumptions used to design the storage system, and provide monitoring and notification in response to the projected future workloads appearing to be invalid as needs and usage of the storage system grows and changes.

According to the embodiments disclosed herein, the planning of the new or modified storage system is provided via a planning application, which includes an interface for the end user to interact with, and is configured to receive, as input through the interface, an initial configuration of a workload (e.g., number of volumes, hosts, mirroring choices, copies, etc.) along with assumptions on the workload's use requirements (e.g., peak bandwidth, peak input/output operations per second (IOPS), etc.), quality of service requirements (e.g., response time requirements, etc.), recovery point objective (RPO) requirements, etc. The planning application is also configured to obtain information regarding possible and/or expected future growth of the storage system in terms of capacity and utilization for this particular workload. After each individual workload is designed and forecast by the planning application, these workloads may be applied at an appropriate time when they are needed by the storage system and unexpected workloads may be tested against the planned storage system to determine whether the storage system design is robust enough to handle disruptions while maintaining adequate free resources to perform according to the end user's expectations.

In additional embodiments described herein, a monitoring application is configured to continuously monitor incoming workloads introduced to the storage system and compare these incoming workloads to the projected workloads designed by the planning application. In response to an incoming workload deviating from a projected workload by a threshold difference amount (as measured by any known comparing statistic), the end user may be notified of the deviation, and possibly the storage system provider in order to design a suitable modification to the storage system to handle the unexpected workload. This preemptive notification allows the end user (and possibly the storage system provider) to recognize potential performance problems prior to any effect on performance of the storage system. Moreover, such a preemptive notification process may allow for possible cost savings to be identified (such as excess capacity, misplaced resources, etc.) and alterations to be proposed to adjust the storage system solution accordingly.

Figure 4:
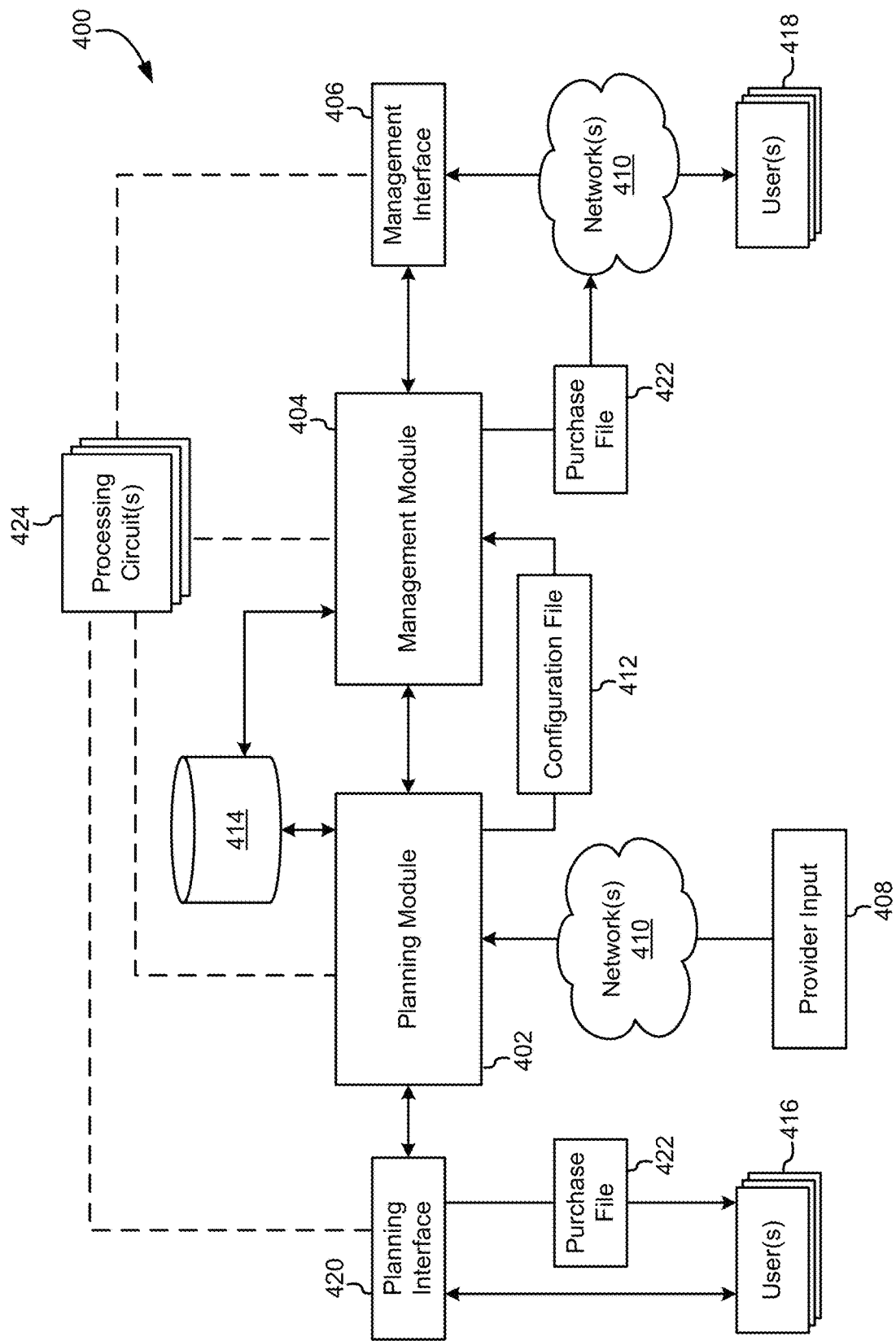
FIG. 4 shows a simplified block diagram of a system according to one embodiment.

With reference to FIG. 4, a system 400 is shown according to one embodiment. The system 400 includes a planning module 402 coupled to storage device(s) that include memory 414 configured to store data for use by the planning module 402 (and possibly other components of the system 400), and a management module 404 that is configured to receive a configuration file 412 from the planning module 402. The management module 404 is coupled to a management interface 406, which may be accessed by one or more users 418 (possibly via one or more networks 410) to allow the one or more users 418 to interact with the management module 404. Also, the management module 404 may be coupled to the storage device(s) that include the memory 414, and/or to a separate memory that is not shared by the planning module 402 in an additional embodiment. In addition, one or more providers and/or vendors may send provider input 408 to the planning module 402 (possibly via one or more networks 410). One or more processing circuits 424 are configured to cause operation of the various modules and interfaces of the system 400.

The planning module 402 has three primary functions: 1) to provide automated visualization and planning of an original storage system, 2) to provide future and/or anticipated modifications for an existing storage system and/or an original storage system over a forward-looking period of time, and 3) to provide a configuration for the original storage system and/or modify a configuration to account for modifications to an existing storage system.

According to various embodiments, the planning module 402 may be resident and executed on a local user's host system, on a remote configuration system, and/or in part remotely and in part locally. The planning module 402 is used to help and/or enable one or more users 416 to visualize and plan an entire storage system in an automated fashion. This planning and visualization may utilize a planning interface 420 (which may be a separate module or embedded within the planning module 402, and may be of a type known in the art that is interoperable within an OS of the host system on which the planning module 402 is executed) that enables interaction between one or more users 416 and the planning module 402. One such user 416 may include a storage administrator, a purchasing agent, a chief technology officer (CTO), or some other suitable person who has technical understanding of the storage needs of a particular entity (e.g., a company that will operate the storage system). Users 416 may be the same as or different from users 418, in part due to the different responsibilities of typical users who plan a storage system versus responsibilities of typical users who maintain a storage system, as would be appreciated by one of skill in the art.

In one embodiment, the planning module 402 is configured to determine requirements (in terms of bandwidth, IOPS, capacity, or some other quantifiable measure of resources) for a storage system (an original storage system that does not yet exist but is being planned for build, or an existing storage system). Moreover, the planning module 402 is configured to determine future storage system requirements of the storage system based on future and/or anticipated workload additions and/or deletions, along with future/anticipated changes to existing workloads.

The one or more users 416 may provide user input via the planning interface 420, with the user input providing insight into aspects of the existing and/or original storage system. The planning module 402 uses some or all available information sources to identify existing and anticipated storage system requirements, as described in more detail below.

In one embodiment, the planning module 402 analyzes an existing storage system to discover all existing (whether active or inactive) workloads from the existing storage system. In other embodiments, the one or more users 416 may provide information that describes all required workloads for an original storage system and/or information that describes one or more existing workloads (possibly all existing workloads, or just those existing workloads which are expected to continue operation in the future) for the existing storage system, or some combination of user input and discovery.

Thereafter, for each existing workload, the planning module 402 determines an initial configuration of each existing workload to identify required capacity. The initial configuration may include any useful parameter that describes an aspect of the workload, such as number and identification of volumes utilized, number and identification of servers for the workload, mirroring choices for the workload, copies that are made of the workload, quality of service (QoS) for the workload (e.g., a maximum response time) that a particular workload is designated to receive, etc. The required capacity of a particular workload may be indicated in terms of peak bandwidth usage, IOPS, response time requirements, RPO requirements, storage space usage, storage utilization type (e.g., data for long term storage, data that is accessed frequently), processor usage and utilization, combinations thereof, etc. In addition, for each existing workload, the planning module 402 determines an expected lifetime of each existing workload and expected increases and/or decreases over the expected lifetime of the individual existing workload. Also, for each anticipated workload, the planning module 402 determines an initiation time (when the anticipated workload is expected to begin operation and/or start to utilize resources) and an expected lifetime of the anticipated workload, along with expected increases and/or decreases over the expected lifetime of the individual anticipated workload.

In accordance with one embodiment, the QoS may be met by ensuring that all workloads which are designated as having a particular level of QoS would be able to be processed simultaneously while still achieving the designated response time with respect to IOPS, bandwidth, and/or some other performance metric known in the art, which may be analyzed based on a response time versus IOPS/bandwidth/performance metric plot.

These increases/decreases may be based on one or more factors, such as user input which specifies expectations of the changes to a particular workload over time, analysis of historical changes to an existing workload to produce interpreted future increases/decreases, minimum and maximum (peak) workload analysis to determine an envelope of usage for a particular workload and how a usage envelope for the particular workload corresponds with a usage envelope for another workload over one or more periods of time (e.g., whether peaks of the particular workload correspond with a minimums of another workload which would allow for averaging of these two workloads over time on a usage basis to account for their combined usage, which would reserve less overall resources than reserving for individual peaks of each workload), etc. Moreover, these increases/decreases are extrapolated from the initial configuration of the particular workload.

To determine increases/decreases over time, a percentage increase may be assumed, which may be based on any of the following: historical growth/decline of the particular workload over a preceding period of time, historical growth/decline of one or more workloads of a similar type over a preceding period of time, anticipated growth/decline entered by a user 416 via the planning interface 420, etc.

After repeating this process for every existing workload and every anticipated workload, the planning module 402 computes the current storage system requirements such that sufficient capacity/bandwidth exists for all existing and anticipated workloads over a near term view. The near term view may be within one year of initialization of the storage system, within 5 years, or some other time period may be set by the user(s) 416 or automated during the planning phase.

In a further embodiment, the planning module 402 computes the current storage system requirements to ensure that QoS requirements will be satisfied for all existing/anticipated workloads, and such that no bottlenecks exist in the storage system that will impede processing for any given workload. In one approach, the planning module 402 may compute the anticipated workloads by relying on existing workloads as a baseline for computing future or anticipated workloads, which may include the existing workloads along with decreases and/or removal of existing workloads and increases and/or additions of new workloads within a forward-looking period of time. This forward-looking period of time may be set by the user(s) 416 or automated to provide insight into the anticipated demands on the present host system, and may include 3 months, 6 months, 1 year, 2 years, 5 years, 10 years, etc.

One output from the planning module 402 that is available after the computations is referred to as a "purchase file" 422, which may be sent to the user(s) 416. The purchase file 422 includes details about all components of an original storage system after planning for the original storage system has concluded. Moreover, in other approaches, the purchase file 422 may include future/anticipated system components and/or upgrades that will be required to be purchased and installed in the storage system over the forward-looking time period to satisfy the existing and anticipated workloads.

In one general approach, the purchase file 422 may specify how many storage systems and of which type the user(s) 416 should order. Moreover, specific configurations each storage system are specified by the purchase file 422 in a format that is understandable by the user(s) 416 and by vendors of the actual storage system(s) and components thereof.

In a further embodiment, purchase files 422 may be generated on a periodic basis, in order to account for updates to the existing storage system as needs and requirements of the storage system become clearer over time (based at least in part on input from the management module 404.

The purchase file 422 includes purchasing information for each component/upgrade specified therein, such as description of the component/upgrade, quantity needed, date to order, lead time for acquisition of the component/upgrade, model number of the component/upgrade, purchase price of the component/upgrade, actual cost for the user 416 of the component/upgrade, etc.

Moreover, in one embodiment, the purchase file 422 may be presented to the user(s) 416 via the planning interface 420 for approval. After approval by the user(s) 416, the purchase file 422 may be sent directly to each individual vendor of the specific components/upgrades specified therein for issuing a purchase order (PO) for these components/upgrades automatically. In one approach, information that describes where and how to issue such POs may be received from each vendor via one or more networks 410 as provider input 408.

In one approach, the provider input 408 may specify some or all information regarding the actual components/upgrades that are available for the storage system, including, but not limited to, lead time for acquisition of the component/upgrade, name of the component/upgrade, description of the component/upgrade, compatibility information for the component/upgrade, model number of the component/upgrade, purchase price of the component/upgrade, actual cost for the user 416 of the component/upgrade, etc.

This provider input 408 is utilized by the planning module 402 to automatically determine which components are available for an original storage system along with which components/upgrades are available for and compatible with an existing storage system. Once this determination is performed, the planning module 402 will only utilize and specify proper components/upgrades for a particular storage system architecture.

A purchase file 422 is shown below in accordance with one example, which is not limiting on what information may be included/excluded from such a file in actual use according to embodiments described herein.

PURCHASE FILE 1
Generation date: Jan. 01, 2018 System type: New
Generation Time: 17:23:28
Storage System 1 - Initial Hardware

| (Product) | (Quantity) | (Purchase Cost) | (Maintenance Fee) | (Term) | (Description) |
| --- | --- | --- | --- | --- | --- |
| 2834-980 DS8884 | 1 | 78,445.00 | 910.00 | Monthly | Serial: N/A |
| 0803 100.1 TB to 250 TB capacity | 1 | N/C | | | |

-continued

PURCHASE FILE 1
Generation date: Jan. 01, 2018 System type: New
Generation Time: 17:23:28
Storage System 1 - Initial Hardware

| (Product) | (Quantity) | (Purchase Cost) | (Maintenance Fee) | (Term) | (Description) |
|---|---|---|---|---|---|
| 1050 Single phase DC-UPS | 2 | 33,720.00 | 120.00 | Monthly | |
| 1062 SPP cord, 200-240 V, 60 A, 3-pin connector | 1 | 3,100.00 | | | |
| 1140 Mgmt console - Primary | 1 | 13,080.00 | 80.00 | Monthly | |
| 1150 Mgmt console - Secondary | 1 | 6,660.00 | 60.00 | Monthly | |
| 1241 HD disk enclosure pair | 5 | N/C | | | |
| 1242 HD STD enclosure indicator | 5 | 102,500.00 | | | |
| 1261 BC Disk drive cable group A | 1 | 1,400.00 | | | |
| 1302 I/O enclosure pair PCIe 3 | 1 | 17,860.00 | 60.00 | Monthly | |
| 1880 DS8000 LMC R8.0 | 1 | 20,000.00 | | | |
| 3053 Device adapter pair I | 2 | 21,900.00 | | | |
| 3353 16 Gb 4 port SW FCP/FICON adapter PCIE | 4 | 57,416.00 | 636.00 | Monthly | |
| 4224 128 GB Processor memory (6-core only) | 1 | 80,088.00 | 808.00 | Monthly | |
| 4421 6-core processor indicator | 1 | N/C | | | |
| 5618 600 GB 15K drive set | 15 | 616,500.00 | 6,375.00 | Monthly | |
| 8151 BF - Up to 100 TB capacity | 10 | N/C | 420.00 | Monthly | |
| 8152 BF - 100.1 TB to 250 TB capacity | 3 | N/C | 132.00 | Monthly | |
| 8251 CS - Up to 100 TB capacity | 10 | N/C | 830.00 | Monthly | |
| 8252 CS - 100.1 TB to 250 TB capacity | 3 | N/C | 261.00 | Monthly | |
| 8300 zsS - Active | 1 | N/C | | | |
| 8351 zsS - Up to 100 TB capacity | 10 | N/C | 830.00 | Monthly | |
| 8352 zsS - 100.1 TB to 250 TB capacity | 3 | N/C | 261.00 | Monthly | |
| AGA6 Shipping and handling 980 | 1 | 3,250.00 | | | |
| | Total | USD 1,055,919.00 | USD 11,783.00 | Monthly | |
| 2839-LF8 DS8000 series Function Authorization | 1 | N/C | | | Serial: N/A |
| 8151 BF - Up to 100 TB capacity | 10 | 115,120.00 | | | |
| 8152 BF - 100.1 TB to 250 TB capacity | 3 | 36,252.00 | | | |
| 8251 CS - Up to 100 TB capacity | 10 | 229,880.00 | | | |
| 8252 CS - 100.1 TB to 250 TB capacity | 3 | 72,396.00 | | | |
| 8300 zsS - Active | 1 | N/C | | | |
| 8351 zsS - Up to 100 TB capacity | 10 | 229,880.00 | | | |
| 8352 zsS - 100.1 TB to 250 TB capacity | 3 | 72,396.00 | | | |
| | Total | USD 755,924.00 | USD 0.00 | | |

This exemplary purchase file 422 includes details about the products to purchase, the quantities to purchase, the purchase cost, any associated maintenance fees associated with operation of the product, the term of the maintenance fees (how often the fees are due), a description of the product, indication of the time and date that the purchase file 422 was created, a description of the storage system, and whether the storage system is original (new) or includes modifications to an existing system.

In one embodiment, the planning module 402 generates a separate configuration file 412 for each storage system that is specified by the planning module 402. These one or more configuration files 412 are sent to the management module 404, stored to the shared memory 414, and/or stored to some other memory accessible to the management module 404. In one embodiment, the management module 404 may send one or more of the individual configuration files 412 to one or more corresponding storage systems automatically after purchase and installation thereof (either purchase of an original storage system or purchase of components/upgrades to an existing storage system) so that the configuration of the corresponding storage system may be automatically applied after the system is installed at the user's site.

The configuration file 412 includes all aspects of a storage system, including a number of components, each type of component, naming schemes for the various components, operating and/or initialization instructions for the components, along with any other desired and/or useful information that enables start-up of the storage system upon installation at the user's site.

In one embodiment, the configuration file 412 may include projected workload behavior for the workloads that are specified for the storage system, including existing workloads and anticipated workloads. This projected workload behavior may be presented in any suitable format that would be understood by the user(s) 418 and/or the management module 404. Moreover, the projected workload includes projections for each workload of the storage system, including when the workload is to be initialized, an expected lifetime for the workload, and a maximum expected resource usage for the workload over one or more different periods of time (which may be stored using any suitable performance metric, such as IOPS, bandwidth, processor usage, etc.).

According to various embodiments, the different periods of time may be set individually for each workload in order to allow the maximum usage to vary across the lifetime of the workload. For example, a particular workload may be greatly involved with initialization of the storage system and shut-down of the storage system, but may be little used during operation of the storage system. In another example, a particular workload may consume substantial resources every weekend (such as a reporting application for the week), but lay dormant during the workweek. Other cyclical and periodic workloads are also possible, as would be understood by one of skill in the art, and accounted for in the projected behavior of the workload.

An example of a configuration file 412 is shown below, which is not limiting on what information may be included/excluded from such a file in actual use according to embodiments described herein.

CONFIGURATION FILE 1

Storage System 1

Name,State,Product,Release,Bundle,MTM,S/N,Machine Signature,WWNN,Number of Frames,Processors,System Memory (GB),Storage Capacity (TB),Last Power on Time, Install Time,Power Control Mode,,,,,,,,,,System A,Online,-, R8.2,88.20.65.0,2831-985,75DMC81,C8F2-B42B-C73EA9F4,5005076306FFD341,1,POWER8,128,45.41,11/7/2016 10:35,-,Automatic,,,,,,,,,, Function Switches, Easy Tier Automatic Mode,Easy Tier Monitor Mode,Easy Tier Heat Map Transfer,Easy Tier Allocation Order,I/O Priority Manager Mode,ESSNet Copy Services,ESSNet Volume Group,IBM i Serial Number Prefix All,All,Enabled,High utilization,Disabled,Enabled,V0, Arrays, ID,State,Pool,Storage Type,Total Capacity (GiB),Allocated Capacity (GiB),Drive Capacity (GB),Drive Class,DA Pair,RAID Level,Configuration,Spare Drives,Volumes, Migrating Capacity,Extent Size, MA2,Normal,regr_fbPool_0,FB,728,108,146,Enterprise 15K,0,RAID 6,"6 data, 2 parity",0,71,-,1 GiB, MA4,Normal,regr_fbPool_0,FB,728,363,146,Enterprise 15K,0,RAID 6,"6 data, 2 parity",0,326,-,1 GiB, MA11,Normal,itso_5,CKD,817,0,146,Enterprise 15K,2, RAID 6,"6 data, 2 parity",0,0,-,"1,113 cylinders", MA13,Normal,regr_ckdPool_3,CKD,4013,0,800,Flash,18, RAID 6,"5 data, 2 parity, 1 spare",1,0,-,"1,113 cylinders", MA14,Normal,regr_ckdPool_2,CKD,4013,0,800,Flash,18, RAID 6,"5 data, 2 parity, 1 spare",1,0,-,"1,113 cylinders", MA15,Normal,regr_fbPool_0,FB,4300,0,800,Flash,18, RAID 6,"6 data, 2 parity",0,0,-,1 GiB, MA16,Normal,stone_fb_4,FB,4300,11,800,Flash,18,RAID 6,"6 data, 2 parity",0,10,-,1 GiB, MA17,Normal,stone_fb_7,FB,4300,9,800,Flash,18,RAID 6,"6 data, 2 parity",0,8,-,1 GiB, Pools, Name,Storage Type,Total Capacity (GiB),Allocated Capacity (GiB),Over-provisioned Ratio,Threshold,Allocated Capacity for Standard Volumes (GiB),Allocated Capacity for ESE Volumes (GiB),Allocated Capacity for TSE Repository (GiB),Allocated Capacity for Metadata (GiB), Encryption,Easy Tier,Number of Arrays,Volumes,Migrating Capacity,Extent Size regr_fbPool_0,FB,5028,363,-,85%,326,0,0,37,Not Encrypted,Managed,2,326,-,1 GiB regr_fbPool_1,FB,728,108,-,85%,71,0,0,37,Not Encrypted, Managed,1,71,-,1 GiB regr_ckdPool_2,CKD,4013,0,-,85%,0,0,0,0,Not Encrypted, Managed,1,0,-,"1,113 cylinders"

regr_ckdPool_3,CKD,4013,0,-,85%,0,0,0,0,Not Encrypted, Managed,1,0,-,"1,113 cylinders"

stone_fb_4,FB,4300,11,-,85%,10,0,0,1,Not Encrypted, Managed,1,10,-,1 GiB itso_5,CKD,817,0,-,85%,0,0,0,0,Not Encrypted,Managed,1, 0,-,"1,113 cylinders"

stone_fb_7,FB,4300,9,-,85%,8,0,0,1,Not Encrypted,Managed,1,8,-,1 GiB

Volumes,

Name,State,Storage Type,Capacity Details (blocks/cylinders),Allocated Capacity (blocks/cylinders),Pool,Node, Thinprovisioning,Allocation Method,LSS,Address Group,MTM,Data Type,VOLSER,GUID,Host Mappings, Scope,Performance Policy,Migrating Capacity, stone_fb_1000,Normal,FB,2097152,2097152,stone_fb_4,0, Standard,Managed,10,1,2107-900,512,-, 6005076306FFD3410000000000001000,100,PUBLIC, PG0,-, stone_fb_1001,Normal,FB,2097152,2097152,stone_fb_4,0, Standard,Managed,10,1,2107-900,512,-, 6005076306FFD3410000000000001001,100,PUBLIC, PG0,-, stone_fb_1002,Normal,FB,2097152,2097152,stone_fb_4,0, Standard,Managed,10,1,2107-900,512,-, 6005076306FFD3410000000000001002,100,PUBLIC, PG0,-, stone_fb_1003,Normal,FB,2097152,2097152,stone_fb_4,0, Standard,Managed,10,1,2107-900,512,-, 6005076306FFD3410000000000001003,100,PUBLIC, PG0,-, hehe_1200,Normal,FB,2048,2048,regr_fbPool_0,0,Standard,Managed,12,1,2107-900,512,-, 6005076306FFD3410000000000001200,100,PUBLIC, PG0,-, hehe_1201,Normal,FB,2048,2048,regr_fbPool_0,0,Standard,Managed,12,1,2107-900,512,-, 6005076306FFD3410000000000001201,100,PUBLIC, PG0,-, hehe_1211,Normal,FB,2048,2048,regr_fbPool_0,0,Standard,Managed,12,1,2107-900,512,-, 6005076306FFD3410000000000001211,100,PUBLIC, PG0,-, hehe_1212,Normal,FB,2048,2048,regr_fbPool_0,0,Standard,Managed,12,1,2107-900,512,-, 6005076306FFD3410000000000001212,100,PUBLIC, PG0,-, LSSs, ID,SSID,Type,Node,Volumes,Aliases,Volume Address Start,Volume Address End,Alias Address Start,Alias Address End,Scope,Address Group,Consistency Group, Consistency Group Timeout (sec),Concurrent Copy Session Timeout (sec),Global Mirror Session Timeout (sec), Critical Heavy Mode,3390-1,3390-3,3390-9,3390-27, 3390-54,3390 Other,3380-2,3380-3,3380 Other 0,100,3990-3,0,0,0,-,-,-,-,PUBLIC,0,Disabled,120,-,-,-,0,0, 0,0,0,0,0,0,0

1,101,3990-3,1,0,0,-,-,-,-,PUBLIC,0,Disabled,120,-,-,-,0,0, 0,0,0,0,0,0,0

10,FF10,-,0,10,0,0,9,-,-,PUBLIC,1,Disabled,60,300,300, Disabled,0,0,0,0,0,0,0,0

11,FF11,-,1,10,0,0,9,-,-,PUBLIC,1,Disabled,60,300,300, Disabled,0,0,0,0,0,0,0,0

12,FF12,-,0,256,0,0,FF,-,-,PUBLIC,1,Disabled,60,300,300, Disabled,0,0,0,0,0,0,0,0

13,FF13,-,1,69,0,0,44,-,-,PUBLIC,1,Disabled,60,300,300, Disabled,0,0,0,0,0,0,0,0

14,FF14,-,0,70,0,0,45,-,-,PUBLIC,1,Disabled,60,300,300, Disabled,0,0,0,0,0,0,0,0

Clusters,

Name,State,Address Mode,Host Mappings,Volumes,test_cluster,Offline,SCSI Mask,100,415, Hosts, Name,State,Type,Cluster,Address Mode,Volumes,Number of Host Ports,Number of Accessible I/O Ports,Address Discovery,Logical Block Size host_0,Offline,AIX,test_cluster,SCSI Mask,415,0,24,Report LUNs,512 host_2,Offline,AIX,test_cluster,SCSI

Mask,415,0,24,Report LUNs,512
host_33,Offline,AIX,test_cluster,SCSI
Mask,415,0,24,Report LUNs,512

It is noted that this exemplary configuration file 412 does not include workload definitions and expected workload behavior of the known and anticipated workloads (e.g., increase/decrease for each workload over the near term view and the long term system lifetime). Such workload definitions and expected workload behavior may be included in a similar fashion to the other information included in the exemplary configuration file 412, with indicators for the parameters being reported and the actual parameters, which may include numbers, descriptions, sizes, requirements, anticipated growth/decline, etc.

In addition, the planning module 402 generates projected workload behavior, which is one or more files, possibly included in the configuration file 412, that describe the expected behavior of the known and anticipated workloads over a near term view and a long term view, the long term view being greater in duration than the near term view. This projected workload behavior may include, but is not limited to, a number of storage systems that will be used, each existing workload at storage system initialization and anticipated performance thereof (using one or more performance metrics to describe the behavior), and each anticipated workload that will initialize after its associated storage system is initialized along with start date and anticipated performance thereof.

In one embodiment, after the configuration file 412 is provided to the storage system by the planning module 402 and/or the management module 404, an appropriate configuration specified by the configuration file 412 is applied for all workloads that are indicated as being configured to initialize at the time of storage system initialization. Anticipated workloads are stored to the memory 414 in an accessible format (such as in the configuration file 412) and applied by the management module 404 to the storage system after it is installed and/or modified according to each anticipated workload's individual initialization time.

This procedure removes responsibility from the user(s) 416 for the initial configuration of the storage system after purchase thereof, because it utilizes the initial configuration of the storage system and/or components/upgrades to an existing storage system to determine the configuration and operation of the storage system based on the work performed by the planning module 402 to configure the storage system initially and with respect to anticipated workload(s).

In response to new demands on the storage system that were anticipated during the planning phase, one or more anticipated workloads to meet these demands (e.g., anticipated workloads that have been planned for in the initial configuration) may be applied directly by the management module 404, either automatically and/or via user input via the management interface 406 (such as after approval by the user(s) 418). These new workloads are able to be applied directly because all necessary information to describe the new workload(s) has already been provided during the planning process via interaction with the planning module 402.

In response to an unanticipated workload arising on the storage system, the management module 404 identifies that the workload has not been anticipated by consulting the configuration file 412 from the shared memory 414 (or some other suitable location) for the particular storage system on which the unanticipated workload has arisen, and provides a notification to the user(s) 418 via the management interface 406 to inform the user(s) 418 that new demands have arisen on the storage system.

In one embodiment, an interface is provided to the user(s) 418 to enter information that describes the unanticipated workload, similar to the interface that was provided by the planning module 402 during the planning phase. After the user(s) 418 describe the unanticipated workload, in various embodiments, the management module 404 and/or the user(s) 418 may determine whether the existing storage system is configured to handle the unanticipated workload with its current configuration, or whether more capacity is needed to handle the unanticipated demand.

In response to a determination that the existing storage system is not configured to handle the unanticipated workload, modifications that will put the storage system in condition to handle the unanticipated workload are determined by the management module 404 and/or the planning module 402, which will specify particular components/upgrades to the existing storage system, along with purchasing information that is available in a purchase file 422.

In one embodiment, after approval by the user(s) 416, the purchase file 422 may be sent directly to each individual vendor of the specific components/upgrades specified therein for issuing a PO for these components/upgrades automatically. In another embodiment, a PO may be generated, and the user(s) 418 may send out the PO manually.

In a further embodiment, unanticipated deviations to existing workloads may be handled according to the above described procedure, whether the deviation is an increase in an existing workload or a decrease/deletion of an existing workload.

According to more embodiments, the management module 404 is configured to monitor a plurality of performance metrics for the storage system once it is installed and operating. These performance metrics are compared to projected workload behavior over the near term view that are retrieved from the configuration file 412. Deviations that occur closer in time to a time when the storage system was initialized or brought back online after modifications may be treated more leniently than deviations that occur after the storage system has settled into a routine or pattern and has a history of expected and predictable behavior.

Moreover, deviations that result in an increase in workloads over the near term view that are greater than a threshold level above the projected workload behavior may be excused because the storage system will have extra capacity to handle such workload increases because some of the anticipated workloads will not have been realized yet (e.g., there is built-in capacity for the long term that is not utilized in the near term view). However, deviations that result in an increase in workloads toward the end of the service projection that are greater than a threshold level above the projected workload behavior are considered more troublesome, and will be dealt with more aggressively. This is because any extra capacity that is built-in to the storage system to begin with is most likely already utilized near the end of the service life.

In one approach, additions/modifications may be suggested to one or more storage systems to account for the unanticipated workload(s). In another approach, an alert and/or notification may be sent to the user(s) 418 indicating the under capacity issue.

According to one embodiment, the management module 404 is configured to monitor performance metric(s) for one or more storage systems. The management module 404 is also configured to receive, obtain, and/or collect information which includes at least one performance metric from any source that outputs such performance metric(s) and/or may be generated by the management module 404. Moreover, the management module 404 is configured to record and/or store the performance metric(s), such as in a database, list, chart, etc., for use in the a subsequent processing operation. The performance metric(s) may be stored to the shared memory 414 in one embodiment, or some other memory accessible to the management module 404.

The management module 404 may monitor the various performance metrics routinely, on a periodic basis, continuously, or however frequently such a performance metric is most useful to be monitored without impeding operation of the storage system or utilizing more resources than the monitoring process is worth. The period of monitoring (e.g., how often information is collected from the storage system) may range anywhere from less than a second, to a minute, an hour, daily, weekly, monthly, etc.

In various approaches, the management module 404 may monitor one or more of the following performance metrics (preferred units are indicated in parentheses, but the metric is not required to be reported as such): bandwidth (reported in MB per second), I/O rate (reported in IOPS), read operations versus write operations ratio for IOPS within one or more time periods (reported as % reads, % writes, or as a decimal fraction), average cache hit rate over one or more time periods (reported as decimal fraction), CPU or processing circuit utilization (reported as percentage), array utilization (reported as percentage), port utilization (reported as percentage), device adapter utilization (reported as percentage), and an amount of data that is not able to be moved, when requested, from a lower performance tier to a higher performance tier in a data storage system (e.g., due to space limitations on the higher performance tier, IOPS limitations, etc.). Of course, other performance metrics as would be understood by one of skill in the art and that are capable of being monitored by the storage system and/or the management module 404 may be monitored in addition to or in place of any of the above described metrics.

Some or all of the performance metrics which are monitored by the management module 404 (and possibly stored to the shared memory 414) may be compared against expected behavior of the workloads of the one or more storage systems, as specified in the corresponding configuration file(s) 412.

In response to a deviation being detected between the monitored behavior of the workload and the expected behavior by a threshold amount (the threshold amount being set by the user(s) 418), a notification may be provided to the user(s) 418 via the management interface 406.

In response to this unexpected behavior becoming problematic, e.g., rising to a level that will cause unacceptable performance issues with one or more of the storage systems, such as not being able to meet QoS requirements, slower than acceptable processing speeds, etc., a report is generated by the management module 404 that details each prospective issue, suggested solutions thereto, and whether new or modified components would alleviate the issue. In the case where new or modified components may be purchased to overcome the issue(s), a purchase file 422 may be generated (by the management module 404 or the planning module 402) that includes information that may be used to acquire the suggested components/upgrades.

In response to this unexpected behavior causing less than expected utilization of one or more storage systems or portions thereof, the report includes details about which components and/or resources are being underutilized, and the user(s) 418 may use this information to analyze whether additional workloads may be processed within the now-identified available resources/capacity. In a further embodiment, the panning module 402 and/or the management module 404 may automatically verify whether additional workloads may be processed within the now-identified available resources/capacity and indicate best options for moving and/or reallocating workloads to accomplish better load balancing and/or resource utilization, as would be understood by one of skill in the art upon reading the present descriptions.

Figure 5:
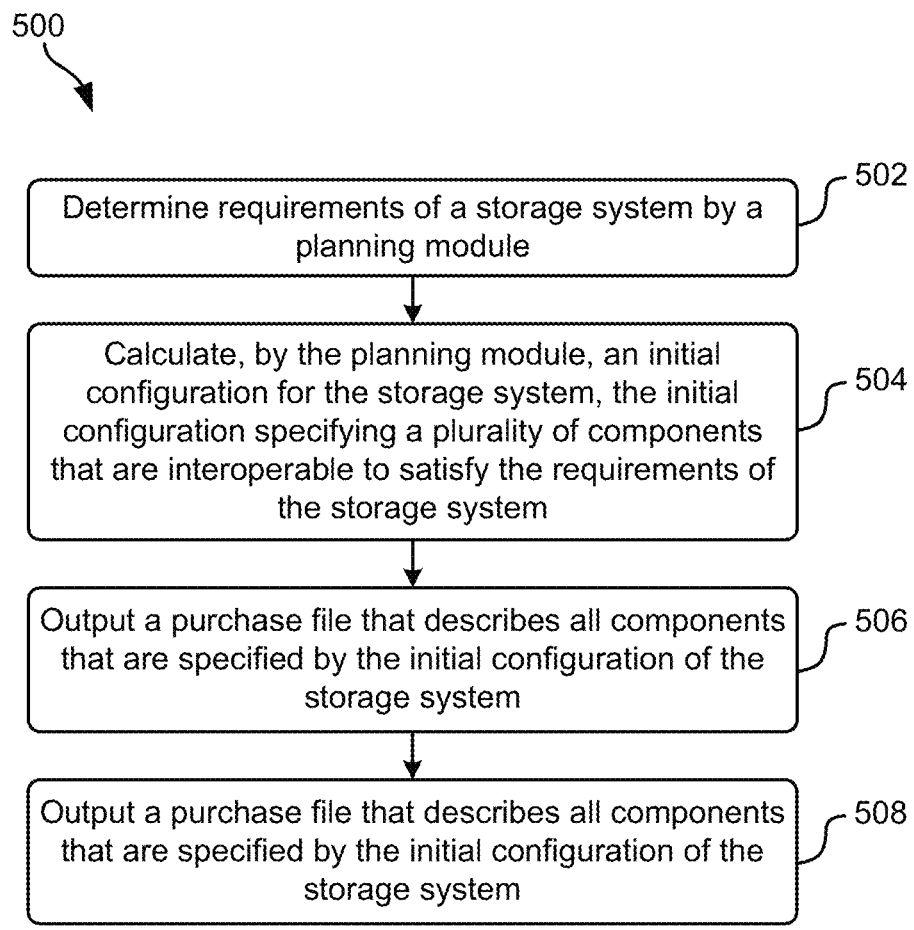
FIG. 5 shows a flowchart of a method, according to one embodiment.

Now referring to FIG. 5, a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a microprocessor, a server, a cluster of computing devices (e.g., a local cluster), a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 500. Illustrative processors include, but are not limited to, a MPU, a CPU, an ASIC, a FPGA, etc., combinations thereof, or any other suitable computing device known in the art.

As shown in FIG. 5, method 500 may start with operation 502, where requirements of a storage system are determined by a planning module.

In one approach, a user may input the requirements, such as in terms of workloads, speeds, back-up requirements, etc. In another approach, such information may be learned from an existing system. In yet another approach, a combination of learning from an existing system and user input may provide the requirements of the storage system.

The requirements may be determined by obtaining, by the planning module, information that describes one or more workloads of the storage system. Thereafter, the information that describes the one or more workloads may be stored to a computer readable storage medium accessible by the planning module. The information that describes the one or more workloads may be learned from an existing system and/or receiving as user input, possibly after requesting the information from one or more users.

In one embodiment, the information may include an initialization date for the one or more workloads, an expected lifetime for the one or more workloads, volumes that are to be used by the one or more workloads, servers that are to be used by the one or more workloads, QoS for the one or more workloads, maximum resource usage for the one or more workloads, an expected increase or decrease in maximum usage for the one or more workloads over an associated lifetime thereof, etc. Moreover, the maximum resource usage for the one or more workloads may be reported as bandwidth usage, IOPS, processor usage, or some other known metric for resource usage.

In operation 504, an initial configuration for the storage system is calculated by the planning module. The initial configuration specifies a plurality of components that are interoperable (and form a functioning storage system) to satisfy the requirements of the storage system.

In operation 506, a purchase file that describes all components that are specified by the initial configuration of the storage system is output, such as via an interface with the user.

The purchase file comprises purchasing information for each component specified by the initial configuration of the storage system, with the purchasing information including any useful information that specifies the component to be purchased, such as description of the component (e.g., name, purpose, model number, etc.), a quantity of each component, and a purchase price of each component, among other types of information.

In another embodiment, possibly after verification with the user, the purchase file, or a portion thereof, may be sent to one or more vendors. In this embodiment, each of the one or more vendors is capable of providing at least one component specified in the initial configuration of the storage system, and the portion of the purchase file that is sent to the vendor corresponds with the component(s) that the vendor is capable of providing.

Such vendor capabilities may be learned by the planning module in an iterative fashion with communications to the various vendors, the communications including what type of storage system is being planned and the type of components to be included. The vendor(s) may then respond with information regarding purchase price, availability of components, installation and lead times, etc.

In operation 508, a configuration file is output. The configuration file is interoperable with at least one of the components specified in the purchase file and is configured to automatically initialize the storage system in response to the components of the storage system being installed.

The configuration file includes operating and/or initialization instructions for appropriate components specified by the initial configuration of the storage system and is executable to initialize the storage system after installation thereof. The configuration file also includes projected workload behavior for a plurality of workloads of the storage system.

In one approach, method 500 may include sending the configuration file to a management module of the storage system after at least a portion of the storage system is installed.

Method 500 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 500.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 500.

Figure 6:
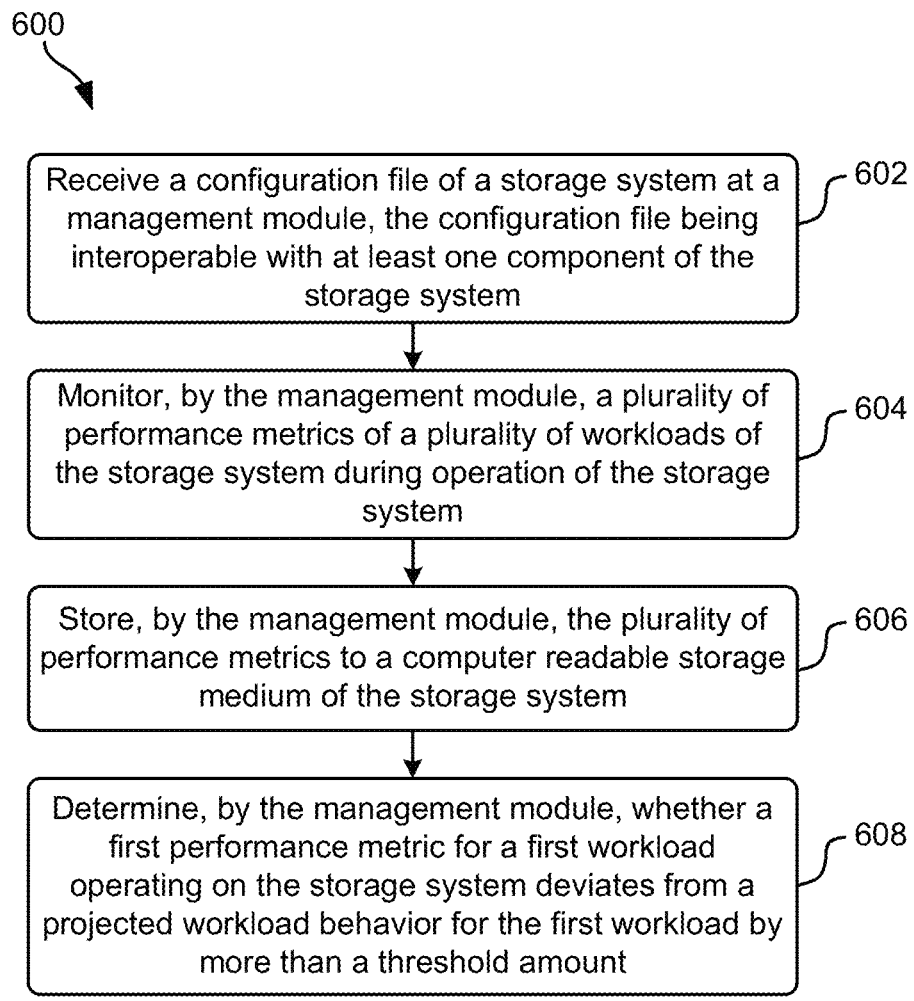
FIG. 6 shows a flowchart of a method, according to one embodiment.

With reference to FIG. 6, a method 600 is shown according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a microprocessor, a server, a cluster of computing devices (e.g., a local cluster), a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a MPU, a CPU, an ASIC, a FPGA, etc., combinations thereof, or any other suitable computing device known in the art.

As shown in FIG. 6, method 600 may start with operation 602, where a configuration file of a storage system is received at a management module. The management module is configured to monitor the storage system. Moreover, the configuration file is interoperable with at least one component of the storage system and is configured to provide automatic initialization of the storage system in response to the storage system, or a portion thereof, being installed. In other words, the configuration file provides all needed information to get the storage system running after the components of the storage system are installed, connected, and powered up.

In one embodiment, the configuration file comprises operating and/or initialization instructions for appropriate components specified by an initial configuration of the storage system that are executable to initialize the storage system after installation thereof. Also, the configuration file includes projected workload behavior for the plurality of workloads over an expected lifetime thereof.

In one approach, the storage system may be initialized, brought online, started-up, etc., by the management module or some other suitable component of the storage system, after the storage system is installed. This is an automatic process that does not require input from the user, beyond simply expressing the desire to have the storage system initiated via the configuration file. The configuration file includes all needed information to get the storage system up and running.

In operation 604, a plurality of performance metrics of a plurality of workloads of the storage system are monitored using the management module during operation of the storage system.

In operation 606, the plurality of performance metrics are stored by the management module to a computer readable storage medium of the storage system.

The performance metrics may include any suitable measures of storage system and/or workload behavior known in the art, including, but not limited to, bandwidth usage, IOPS, processor usage, etc.

In operation 608, it is determined, by the management module, whether a first performance metric for a first workload operating on the storage system deviates from a projected workload behavior for the first workload by more than a threshold amount. This threshold amount may be a static value or may dynamically adjust to account for changes that occur to the storage system after initialization thereof.

In one embodiment, method 600 may include outputting a notification of a deviation from the projected workload behavior to a user (possibly via an interface of the management module) in response to a determination that the first performance metric deviates from the projected workload behavior by more than the threshold amount.

In a further embodiment, method 600 may include determining at least one component and/or upgrade to an existing component of the storage system to add to the storage system in order to account for the deviation in response to the determination that the first performance metric deviates from the projected workload behavior by more than the threshold amount. In addition, an updated purchase file that describes the at least one component and/or the upgrade may be output, such as via the interface with the user and/or by sending the purchase file to an appropriate vendor to determine purchase pricing, availability, lead time, etc., for the at least one component and/or the upgrade outputting an updated configuration file that is executable to initialize the at least one component and/or the upgrade in the storage system in response to installation of the at least one component and/or the upgrade.

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 600.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 600.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining requirements of a storage system by a planning module;
   calculating, by the planning module, an initial configuration for the storage system, the initial configuration specifying a plurality of components that are interoperable to satisfy the requirements of the storage system;
   outputting a purchase file that describes all components that are specified by the initial configuration of the storage system;
   outputting a configuration file that is interoperable with at least one of the components specified in the purchase file and is configured to automatically initialize the storage system in response to the components of the storage system being installed, wherein determining the requirements of the storage system comprises:
   obtaining, by the planning module, information that describes one or more workloads of the storage system; and
   storing, by the planning module, the information that describes the one or more workloads to a computer readable storage medium,
   wherein the information is selected from the group consisting of: an initialization date for the one or more workloads, an expected lifetime for the one or more workloads, volumes that are to be used by the one or more workloads, servers that are to be used by the one or more workloads, quality of service (QoS) for the one or more workloads, maximum resource usage for the one or more workloads, and an expected increase or decrease in maximum usage for the one or more workloads over an associated lifetime thereof.

2. The method as recited in claim 1, wherein the maximum resource usage for the one or more workloads is selected from the group consisting of: bandwidth usage, input/output operations per second (IOPS), and processor usage.

3. The method as recited in claim 1, comprising:
   sending at least a portion of the purchase file to one or more vendors, each of the one or more vendors providing at least one component specified in the initial configuration of the storage system, wherein the purchase file comprises purchasing information for each component specified by the initial configuration of the storage system, the purchasing information comprising: description of each component, and quantity of each component.

4. The method as recited in claim 1, comprising:
sending the configuration file to a management module of the storage system after at least a portion of the storage system is installed,
wherein the configuration file comprises:
  operating and/or initialization instructions for appropriate components specified by the initial configuration of the storage system and is executable to initialize the storage system after installation thereof; and
  projected workload behavior for the one or more workloads of the storage system.

5. A method, comprising:
receiving a configuration file of a storage system at a management module, the configuration file being interoperable with at least one component of the storage system;
monitoring, by the management module, a plurality of performance metrics of a plurality of workloads of the storage system during operation of the storage system, wherein the configuration file comprises:
  operating and/or initialization instructions for appropriate components specified by an initial configuration of the storage system that are executable to initialize the storage system after installation thereof; and
  projected workload behavior for the plurality of workloads;
storing, by the management module, the plurality of performance metrics to a computer readable storage medium of the storage system; and
determining, by the management module, whether a first performance metric for a first workload operating on the storage system deviates from a projected workload behavior for the first workload by more than a threshold amount.

6. The method as recited in claim 5, comprising:
initializing, by the management module, the storage system after the storage system is installed using the configuration file.

7. The method as recited in claim 5, wherein the plurality of performance metrics are selected from the group consisting of: bandwidth usage, input/output operations per second (IOPS), and processor usage.

8. The method as recited in claim 5, comprising:
outputting a notification of a deviation from the projected workload behavior to a user in response to a determination that the first performance metric deviates from the projected workload behavior by more than the threshold amount.

9. The method as recited in claim 8, comprising:
determining at least one component and/or upgrade to an existing component of the storage system to add to the storage system in order to account for the deviation in response to the determination that the first performance metric deviates from the projected workload behavior by more than the threshold amount;
outputting an updated purchase file that describes the at least one component and/or the upgrade; and
outputting an updated configuration file that is executable to initialize the at least one component and/or the upgrade in the storage system in response to installation of the at least one component and/or the upgrade.

10. A computer program product, the computer program product comprising a computer readable storage medium having program instructions embodied therewith, wherein the computer readable storage medium is not a transitory signal per se, the embodied program instructions being executable by a processing circuit to cause the processing circuit to perform a method, comprising:
determining requirements of a storage system by a planning module;
calculating, by the planning module, an initial configuration for the storage system, the initial configuration specifying a plurality of components that are interoperable to satisfy the requirements of the storage system;
outputting a purchase file that describes all components that are specified by the initial configuration of the storage system;
outputting a configuration file that is interoperable with at least one of the components specified in the purchase file and is configured to automatically initialize the storage system in response to the components of the storage system being installed;
sending the configuration file to a management module of the storage system after at least a portion of the storage system is installed; and
initializing, by the management module, the storage system after the storage system is installed using the configuration file,
wherein the configuration file comprises:
  operating and/or initialization instructions for appropriate components specified by the initial configuration of the storage system and is executable to initialize the storage system after installation thereof; and
  projected workload behavior for a plurality of workloads of the storage system.

11. The computer program product as recited in claim 10, wherein determining the requirements of the storage system comprises:
obtaining, by the planning module, information that describes one or more workloads of the storage system; and
storing, by the planning module, the information that describes the one or more workloads to a computer readable storage medium.

12. The computer program product as recited in claim 11, wherein the information is selected from the group consisting of: an initialization date for the one or more workloads, an expected lifetime for the one or more workloads, volumes that are to be used by the one or more workloads, servers that are to be used by the one or more workloads, quality of service (QoS) for the one or more workloads, maximum resource usage for the one or more workloads, and an expected increase or decrease in maximum usage for the one or more workloads over an associated lifetime thereof.

13. The computer program product as recited in claim 12, wherein the maximum resource usage for the one or more workloads is selected from the group consisting of: bandwidth usage, input/output operations per second (IOPS), and processor usage.

14. The computer program product as recited in claim 10, wherein the method comprises:
sending at least a portion of the purchase file to one or more vendors, each of the one or more vendors providing at least one component specified in the initial configuration of the storage system, wherein the purchase file comprises purchasing information for each component specified by the initial configuration of the storage system, the purchasing information comprising: a description of each component, and quantity of each component.

15. The computer program product as recited in claim 10, wherein the method comprises:

monitoring, by a management module, a plurality of performance metrics for the storage system during operation of the storage system; and storing, by the management module, the plurality of performance metrics to a computer readable storage medium of the storage system, wherein the plurality of performance metrics are selected from the group consisting of: bandwidth usage, input/output operations per second (IOPS), and processor usage.

16. The computer program product as recited in claim 15, wherein the method comprises:

determining, by the management module, whether a first performance metric for a first workload deviates from a projected workload behavior for the first workload by more than a threshold amount; and outputting a notification of a deviation from the projected workload behavior to a user in response to a determination that the first performance metric deviates from the projected workload behavior by more than the threshold amount.

17. The computer program product as recited in claim 16, wherein the method comprises:

determining at least one component and/or upgrade to an existing component of the storage system to add to the storage system in order to account for the deviation in response to the determination that the first performance metric deviates from the projected workload behavior by more than the threshold amount;

outputting an updated purchase file that describes the at least one component and/or the upgrade; and outputting an updated configuration file that is executable to initialize the at least one component and/or the upgrade in the storage system in response to installation of the at least one component and/or the upgrade.

* * * * *